United States Patent [19]
Adamson

[11] Patent Number: 5,135,337
[45] Date of Patent: Aug. 4, 1992

[54] LIGHTWEIGHT METAL CUTTER

[76] Inventor: Thomas Adamson, 1619 N. Home, Mishawaka, Ind. 46545

[21] Appl. No.: 306,777

[22] Filed: Feb. 3, 1989

Related U.S. Application Data

[63] Continuation of Ser. No. 26,099, Mar. 16, 1987, abandoned.

[51] Int. Cl.⁵ .............................................. B23B 27/14
[52] U.S. Cl. ........................................ 407/119; 407/32
[58] Field of Search .................. 407/32, 34, 118, 119, 407/120, 30

[56] References Cited

U.S. PATENT DOCUMENTS

| | | | |
|---|---|---|---|
| 2,325,746 | 8/1943 | Curtis | 407/32 |
| 2,624,381 | 1/1953 | Von Der Werth | 407/32 |
| 2,794,458 | 6/1957 | Dosker | 407/32 |
| 3,292,237 | 12/1966 | Fisher | 407/32 |
| 3,955,038 | 5/1976 | Lindstrom | 407/119 |
| 4,266,449 | 5/1981 | Bielby | 407/119 |
| 4,643,620 | 2/1987 | Fujii | 407/119 |
| 4,720,216 | 1/1988 | Smith | 407/114 |
| 4,753,854 | 6/1988 | Gavrilov | 407/119 |

OTHER PUBLICATIONS

Kennametal Catalog, Kennametal Inc. Latrobe, Pa. 15650 pp. 21-22 Dec. 1980.

*Primary Examiner*—Bruce M. Kisliuk
*Assistant Examiner*—John A. Marlott
*Attorney, Agent, or Firm*—James D. Hall

[57] ABSTRACT

A metal cutter where the body of the cutter is formed from aluminum and the outer surface is coated with a hard surface material.

3 Claims, 1 Drawing Sheet

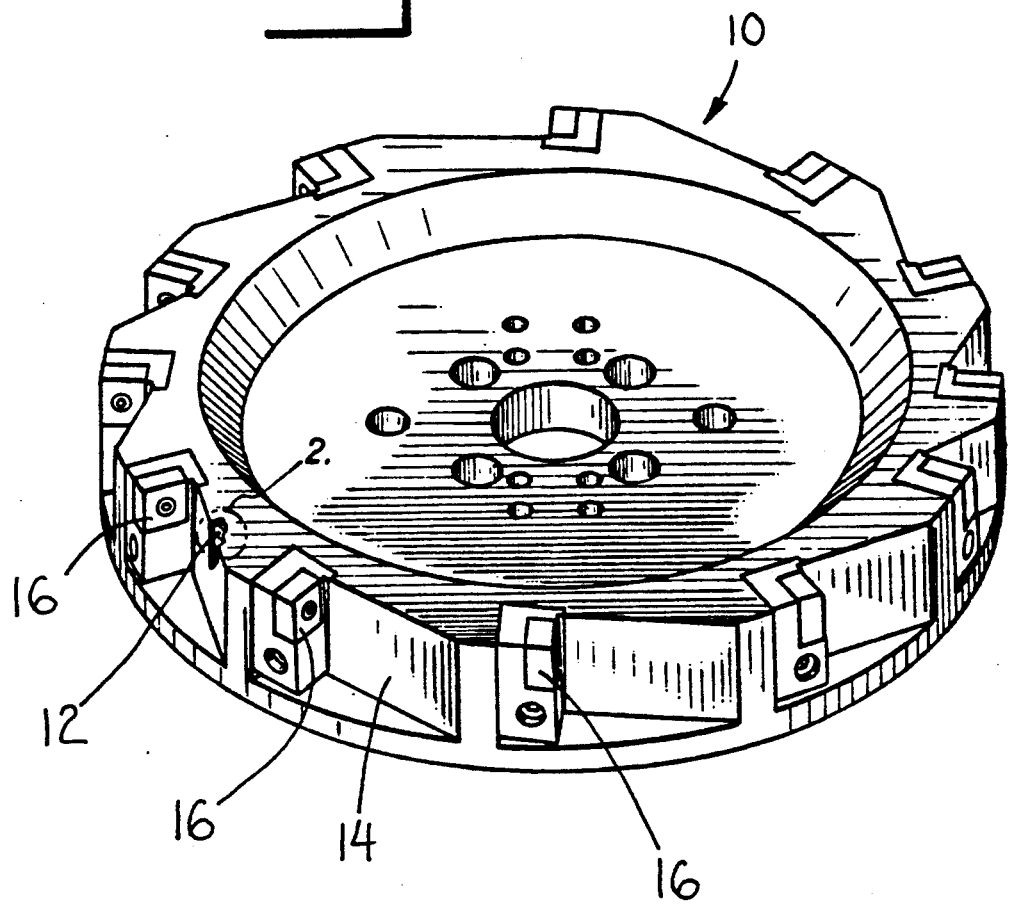
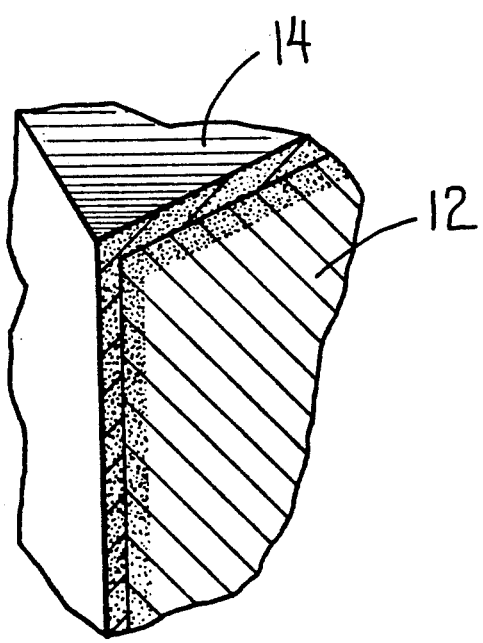

LIGHTWEIGHT METAL CUTTER

This is a continuation of co-pending application Ser. No. 026,099 filed on Mar. 16, 1987, now abandoned.

SUMMARY OF THE INVENTION

This invention relates to a cutting device and will have more particular application to a cutter having an aluminum inner body and a hard outer surface.

Heretofore, mill cutters, boring bars and the like used in industry to mill or cut metal have been formed with a steel body. One of the problems associated with a solid steel body cutter is its weight. The density of the metal and corresponding weight causes the inherent vibration of the cutter to be magnified upon cutter rotation producing a roughed work piece surface. Another problem associated with a heavy steel body mill cutter or boring bar is that a large motor is required to turn the cutter at acceptable speeds. A further problem of a steel body cutter is heat dissipation. The cutter of this invention eliminates the problems associated with steel body cutters.

In this invention the cutter includes a body which is made from aluminum to substantially reduce the overall weight of the cutter and which is then impregnated with an anodized coating to form a hard outer surface. Reducing by one-half to two-thirds the weight of the cutter by using an aluminum body allows the use of a larger cutter without increasing the horse power of the machine. A lighter cutter can be more quickly and easily installed. Vibration is reduced, thus improving the smoothness of the work piece surface. Also, by a reduction in cutter vibration, bearing wear of the cutter drive is reduced.

Accordingly, it is an object of this invention to provide for a more economically usable cutter.

Another object of this invention is to provide for a lightweight cutter.

Another object of this invention is to provide for a cutter that reduces vibration, thus improving the cut work piece surface.

Further objects of this invention will become apparent upon a reading of the following description.

BRIEF DESCRIPTION OF THE DRAWINGS

FIG. 1 is a perspective view of a milling cutter with portions cut away for illustrative purposes.

FIG. 2 is a sectional enlargement of the body of the cutter shown encircled in FIG. 1.

DESCRIPTION OF THE PREFERRED EMBODIMENT

The preferred embodiment illustrated is not intended to be exhaustive or to limit the invention to the precise form disclosed. It is chosen and described in order to best explain the principles of the invention, its application and practical use to thereby enable others skilled in the art to best utilize the invention.

Cutter 10 as shown in FIG. 1 includes an aluminum inner body 12 which has a hard surface coating 14. A plurality of cutting inserts 26 extend from and are attached to body 12. Inner body 12 is formed of 7075-T651 aluminum (S.A.E. specification AA7075) and coating 14 may be of an anodized hard surface material having an aluminum oxide and Teflon composition (military specification 8625 Type 3) and a Rockwell hardness from between 62 and 64C. Coating 14 is shown to be approximately 0.0018–0.0025 inches thick with half of that thickness impregnating the outer surface of inner body 12.

It should be understood that cutting inserts 16 are included for illustrative purposes only and their positioning does not constitute an item of novelty in the present application. It should also be understood that although a milling cutter is depicted, the invention has use in all forms of cutters, such as a side mill cutter, slot cutters, boring bar holders or boring heads.

It is to be further understood that the invention is not to be limited to the details above given, but may be modified within the scope of the appended claims.

What I claim is:

1. A cutter for metal, said cutter comprising a body, a cutting element being detachably secured to and extending from said body for engaging and cutting said metal, said body being formed of a lightweight soft metal and having an outer surface, said body having about its outer surface a coating of wear resistant material.

2. The cutter of claim 1 wherein said soft metal is aluminum.

3. The cutter of claim 2 wherein said coating is a hard surface material having a Rockwell hardness of approximately between 62 and 64C.

* * * * *

REEXAMINATION CERTIFICATE (2153rd)

United States Patent [19]

Adamson

[11] B1 5,135,337

[45] Certificate Issued  Dec. 14, 1993

[54] LIGHTWEIGHT METAL CUTTER

[76] Inventor: Thomas Adamson, 1619 N. Home, Mishawaka, Ind. 46545

Reexamination Request:
No. 90/002,973, Mar. 1, 1993

Reexamination Certificate for:
Patent No.: 5,135,337
Issued: Aug. 4, 1992
Appl. No.: 306,777
Filed: Feb. 3, 1989

Related U.S. Application Data

[63] Continuation of Ser. No. 26,099, Mar. 16, 1987, abandoned.

[51] Int. Cl.⁵ ............................................. B23B 27/14
[52] U.S. Cl. ............................................ 407/119; 407/32
[58] Field of Search .................. 407/30, 32, 34, 118, 407/119, 120

[56] References Cited

U.S. PATENT DOCUMENTS

2,840,887  7/1958  Donnelly ........................... 407/32

FOREIGN PATENT DOCUMENTS

2081176A  8/1980  United Kingdom .

OTHER PUBLICATIONS

Military Specification Anodic Coatings, For Aluminum and Aluminum Alloys; MIL-A-8625C, Jun. 4, 1965, and MIL-A-8625C Amendment 1, Mar. 13, 1969; U.S. Government Printing Office.
Metal Finishing—Guidebook and Directory Issue '83 1983 pp. 510–520, 624–626 & 966–973.

*Primary Examiner*—William E. Terrell

[57] ABSTRACT

A metal cutter where the body of the cutter is formed from aluminum and the outer surface is coated with a hard surface material.

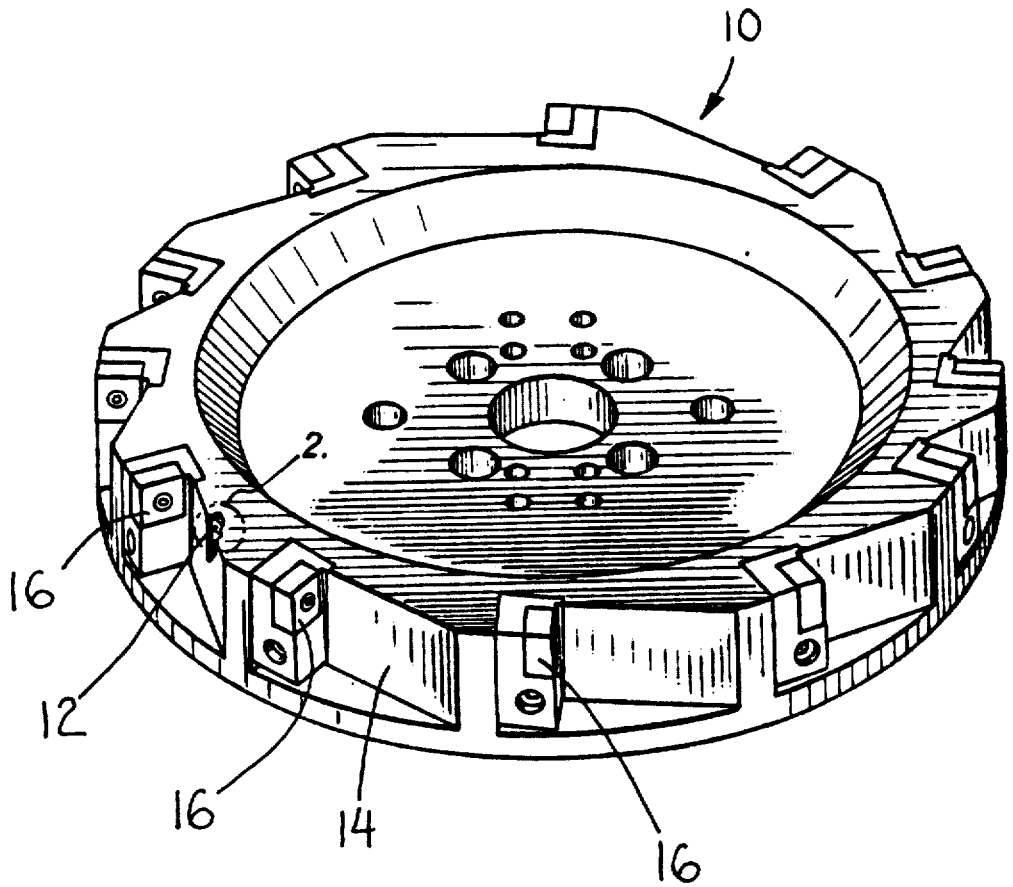

REEXAMINATION CERTIFICATE ISSUED UNDER 35 U.S.C. 307

THE PATENT IS HEREBY AMENDED AS INDICATED BELOW.

Matter enclosed in heavy brackets [] appeared in the patent, but has been deleted and is no longer a part of the patent; matter printed in italics indicates additions made to the patent.

AS A RESULT OF REEXAMINATION, IT HAS BEEN DETERMINED THAT:

Claims 1-3 are cancelled.

* * * * *